UNITED STATES PATENT OFFICE.

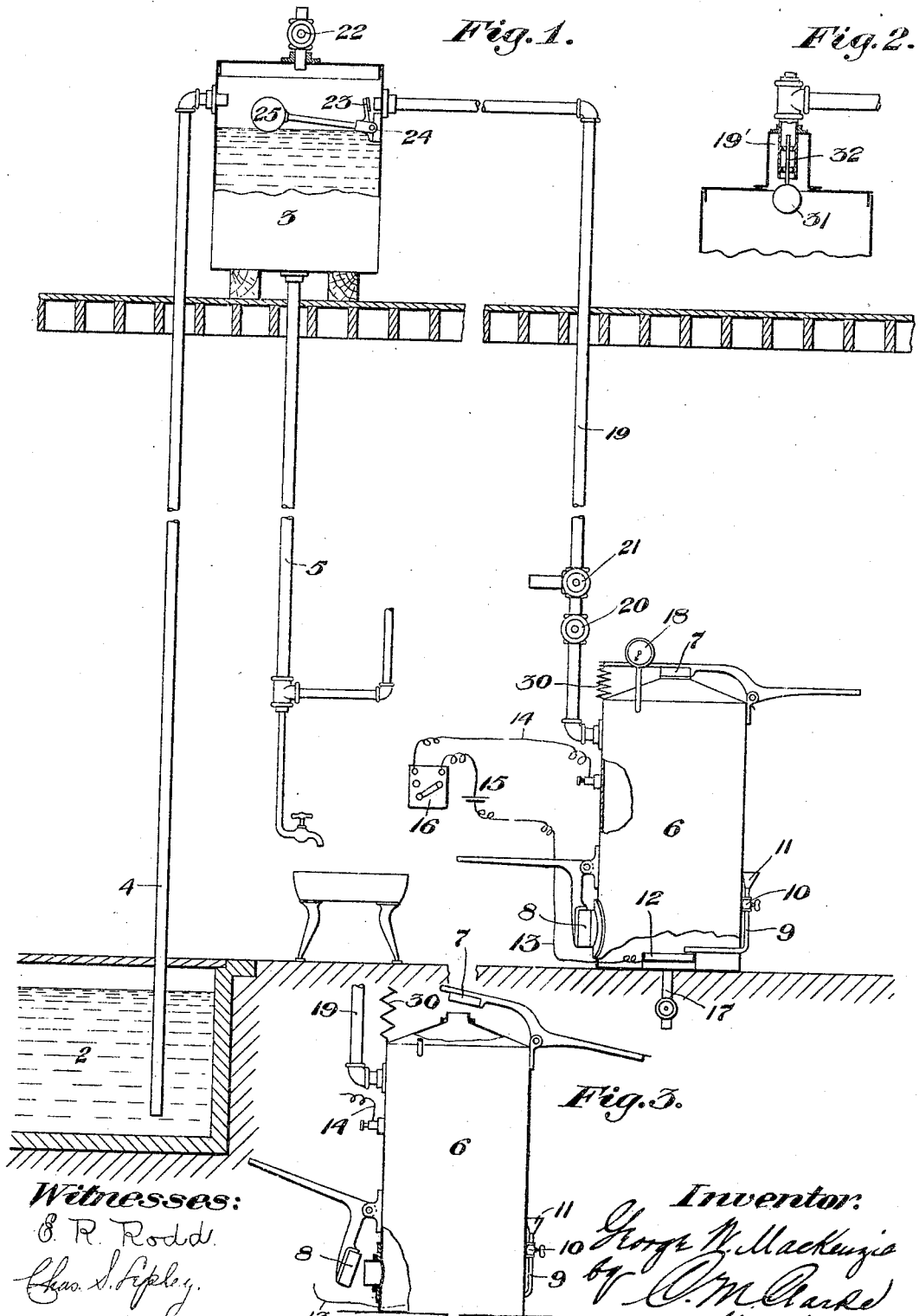

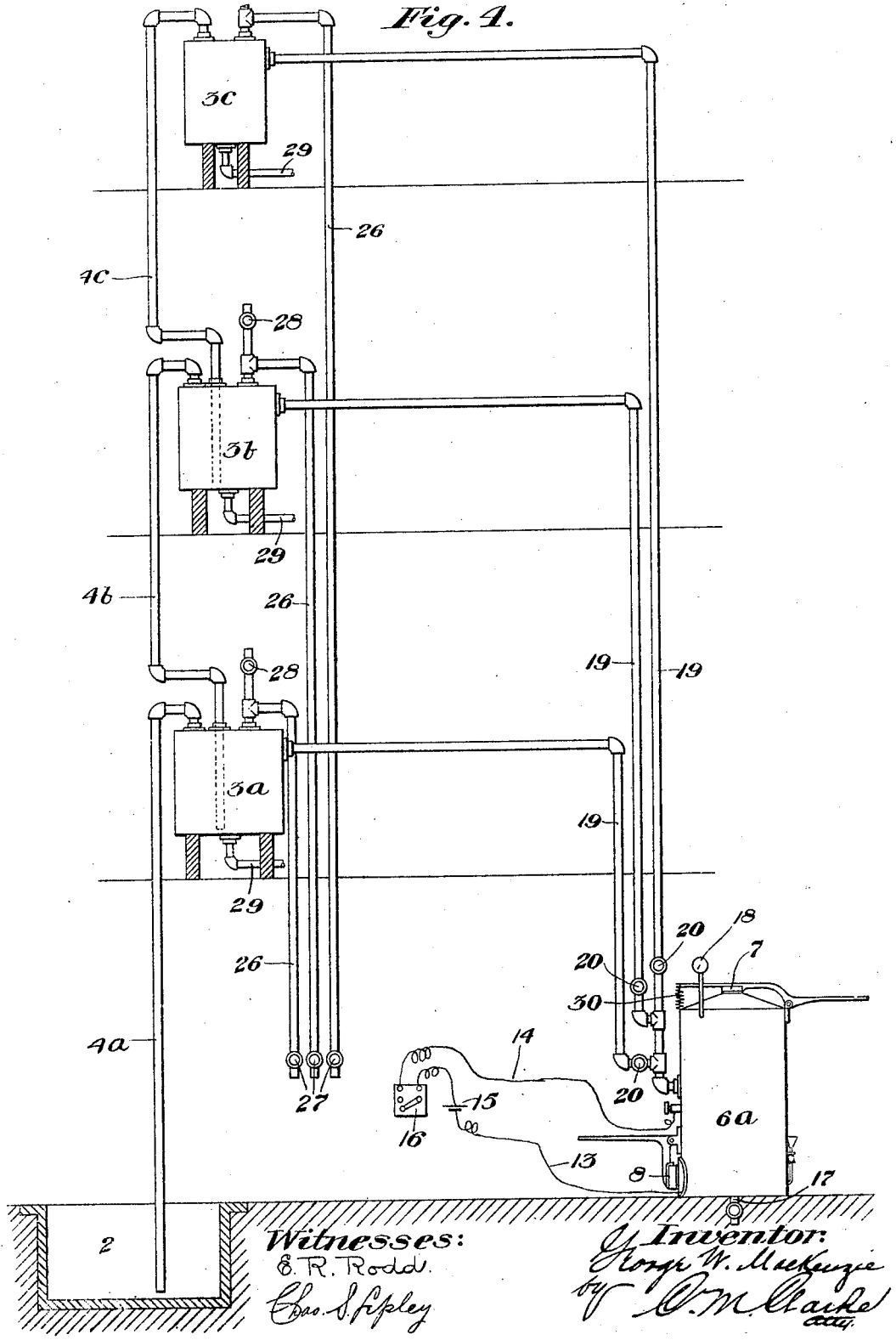

GEORGE W. MacKENZIE, OF BEN AVON, PENNSYLVANIA.

APPARATUS FOR ELEVATING WATER.

No. 804,196.

Specification of Letters Patent.

Patented Nov. 7, 1905.

Application filed January 5, 1905. Serial No. 239,762.

*To all whom it may concern:*

Be it known that I, GEORGE W. MACKENZIE, a citizen of the United States, residing at Ben Avon, in the county of Allegheny and State of Pennsylvania, have invented certain new and useful Improvements in Apparatus for Elevating Water, of which the following is a specification, reference being had therein to the accompanying drawings, forming part of the specification, in which—

Figure 1 is a vertical sectional view of a portion of a building or plant, showing the instalment of my improved apparatus as applied to one story thereof. Fig. 2 is a vertical sectional detail view illustrating a modified form of check-valve. Fig. 3 is a detail view of the vacuum-chamber, showing the air-valves open. Fig. 4 is a view in elevation, showing a series of tanks located at successively higher levels.

My invention refers to improvements in apparatus for raising water or other liquids and is designed to utilize the normal atmospheric pressure by producing a partial or complete vacuum in a separate combustion-chamber connected with a tank or other suitable vessel, said tank having a connection with a cistern or other source of water-supply at a lower level. I am aware that various patents have been granted for apparatus employing or utilizing the same general principle designed to cause an upward flow of water into a vacuum-chamber itself; but my invention consists in the combination, with one or more storage tanks or reservoirs, of a separate vacuum-producing device together with various features of improvement and utility adapted to render the invention successfully operative and applicable to various conditions of domestic use, as shall be more fully hereinafter described.

Referring to the drawings, 2 represents a cistern, well, or other source of water-supply from which it is desired to elevate the water to a higher level and deposit it into a storage reservoir or tank 3, located at a height above the level of the cistern 2 within available limits.

4 is a supply-pipe leading from the cistern to the tank 3, from which, preferably at the bottom, leads a distributing-pipe 5, having one or more terminal faucets, as shown, or connected in any suitable manner so as to furnish a water-supply under the head of the reservoir 3.

6 is the vacuum-producing chamber, consisting of an air-tight tank or other suitable structure, preferably provided with opening and closing doors or valves 7 8, so as to permit a scavenging circulation of air therethrough and also to permit of a safety-exhaust at the moment of explosion. This vessel is properly braced and made of suitable strength to prevent collapsing and is designed to inclose any combustible fuel, as oil, gas, &c., and for the purpose in view I have secured good results from gasolene, which vaporizes readily. For the purpose of introducing the combustible fuel into the interior of the tank I have provided a feed-pipe 9, having a valve 10 and a filling-funnel 11, which may conveniently be used as a measuring device. The pipe 9 leads inwardly to the interior of the vessel 6 and discharges the fuel into a receiving-pan 12, located at or about the bottom of the vessel, it being understood that only sufficient fuel is employed to make when vaporized a proper combination with the inclosed content of air. If preferred, the fuel may be merely discharged upon the bottom of the vacuum vessel; but I prefer to employ a receiving-pan, as shown, thereby preventing the dilution of the fuel by any water which may be collected in the bottom of the vessel. The ignition of the fuel may be produced in any desirable manner, as by merely introducing a lighted match or paper into the interior; but I prefer to use an electric sparking device and have indicated the terminals of a circuit 13 14, connected to the pan 12 and to the shell of the vessel 6, through which by pipe 9 the current will be carried to a point adjacent to the pan. A switch 16 may be located at any suitable point, and if it is desirable that the vacuum-chamber shall be located at some point remote from the point of operation the electric ignition is well adapted to such purpose. Any means for the combustion of the oxygen, so as to produce a resulting vacuum within chamber 6, may be employed, and I do not desire to be limited to these means and may utilize electrical currents in the interior of the chamber for this purpose or the oxygen may be destroyed or consumed chemically. It is obvious that the charging of the fuel into the vessel may be accomplished in the same manner from a distance through a suitable supply-pipe, if desired. An especial advantage of locating the combustion-tank outside of a residence or other point of operation is that it may be isolated and, if desired, may be surrounded by any additional protecting structure, as a brick or cement wall, thus insuring entire safety from fire. If preferred, the vacuum-chamber itself may consist of a built-up chamber of brick or other suitable material, as cement, and may conveniently be set below the level of the ground or in any protected location remote from residences or other buildings, although such precautions are not absolutely necessary unless large amounts of gasolene or other inflammable fuel are also stored near by.

The explosion or vacuum chamber is preferably provided with a drain-pipe 17, by which any water of condensation or from any other source can be drawn off, and a vacuum-gage 18 indicates the degree of vacuum. Pipe 19 connects the vacuum-tank with tank 3 at the top thereof and is provided with a valve 20, by which communication may be shut off after filling the tank in case it is desirable to utilize any remaining vacuum to again fill the tank without another explosion. An air-inlet cock 21 is also provided to admit an inflow of air during emptying of the tank 3, said cock being within reach from the ground-floor, while an independent air-cock is also connected with the tank itself, allowing admission of air and independent operation of the cock from the upper floor.

In Fig. 2 I have shown a modified form of float-valve consisting of a ball 31, having a guiding-stem 32 projecting up through suitable guides in the interior of the vacuum-pipe 19'. The ball-float has a limited travel and will be seated against the lower end of the pipe when the water reaches the ultimate level.

The operation of the invention is as follows: The explosion-tank having been charged with a sufficient amount of fuel, a very limited amount being sufficient to produce efficient results, the valves 7 and 8 are closed down tight by any suitable securing means, and a spark is produced in the interior which ignites the gaseous fumes of the fuel or the fuel itself and the resulting combustion immediately consumes the inclosed air, terminating in a slight explosion and producing a resulting vacuum or partial vacuum in chamber 6. Thereupon atmospheric pressure upon the water in the cistern will force it upwardly through pipe 4, filling the tank 3 until the suction effect of the tank 6 is shut off by the float-valve, when the water may be drawn off for use through pipe 5. For the purpose of closing the outlet end of said pipe any means may be employed adapted to operate automatically upon rise of the water, so as to prevent it from flowing back through pipe 19, and for this purpose I have shown a valve 23, pivoted at 24 and provided with a float 25, such construction being adapted to seal the opening of pipe 19 and arrest the flow of the air backwardly into chamber 6 upon the filling of tank 3. By connecting pipe 19 a vacuum corresponding to that in chamber 6 is produced in the interior of tank 3, upon which the atmospheric pressure will force the water from cistern 2 upwardly from pipe 4 and into the tank. The flow of water will continue until the vacuum is sufficiently reduced or until the tank 3 is filled to the normal level and the valve 23 closed. In the latter case the remaining vacuum in chamber 6 will be reserved for future use for any further necessary explosion.

The air-valves 7 and 8 are adapted to seat against suitable gaskets, hermetically sealing the tank against entrance of outside air, and are securely held closed by any suitable means. I prefer to provide means for holding one of these valves to its seat by means of spring-pressure and have shown at 30 a spring attached to an extension of the valve-arm for this purpose. An especial advantage of this construction is that upon the sudden expansion of the contents resulting from the explosion the valve 7 is momentarily opened, allowing any excess air to escape, immediately closing again automatically. In practice I have found that the valve will open and close quickly a number of times under the pulsating expansion until all excess air is relieved, finally closing tight under action of the spring. This automatic relief of the air contributes to the efficiency and economy of operation.

It is obvious that the application of the invention is not limited to a single tank, and in Fig. 4 I have shown a plurality of storage-tanks $3^a$ $3^b$ $3^c$, connected by exhaust-pipes $19^a$ $19^b$ $19^c$ with the vacuum-chamber 6, each pipe being provided with a controlling-valve 20, so that all but one may be cut out of service. The main supply-pipe $4^a$ from the cistern is connected with first tank $3^a$, preferably at the top, to prevent backflow upon admission of air into the tank. A similar pipe $4^b$ leads from the bottom of tank $3^a$ to top of tank $3^b$, while a corresponding pipe $4^c$ leads from the bottom of tank $3^b$ to top of tank $3^c$. The capacity of each successively lower tank is preferably somewhat greater than that of the next upper tank, as shown, thereby insuring sufficient contents to insure filling of the next higher tank, and it will be understood that each tank is preferably provided with a check-valve to automatically terminate the operation. Each tank is provided with an air-supply pipe 26, having an air-inlet-controlling valve 27, preferably located within reach of the operator, adjacent to the switch 16 on the ground floor. For the purpose of admitting air to either of the tanks at its own level each tank is also preferably provided with an independent air-inlet valve 28, as shown, while each tank is provided with its appropriate outlet-supply pipe 29, leading to any point of consumption. It will be understood that the air connections for each tank are closed during the vacuum-filling operation of such tank, the air being admitted to that tank from which the water is being drawn to the next higher one and also to all of the tanks when filled, so as to facilitate the service-flow of water. With this arrangement it is designed that the tanks shall be filled successively from below— i. e., from the main supply-cistern to the first tank and from thence to the second, and so on successively in stages until the top tank is full. The physical limits of atmospheric pressure are thus not exceeded, the vertical distance between the tanks and between the lower tank and the cistern not usually exceeding the height of an ordinary house story— say ten to twelve feet—although the apparatus will operate successfully at much greater heights. The operation of this arrangement is as follows: Valve 20 for the lower tank being opened (the other valves 20 being closed) and valves 27 and 28 of the lower tank being closed, likewise valves 28 of all the other tanks to prevent flow of air into lower tank $3^a$, and a vacuum having been produced in chamber $6^a$ the tank $3^a$ will be filled. The vacuum communication with tank $3^a$ is then closed and the communication through second pipe 19 to tank $3^b$ is opened, likewise the air communication into tank $3^a$, whereupon the second tank $3^b$ is filled, the same operation being then repeated as to tank $3^c$, drawing its water from tank $3^b$. This operation is repeated until the highest of a series of tanks to any height is full, inasmuch as such operation merely involves a repetition of each step within the physical limits of height between any two adjacent tanks. The lowermost tank is then again filled from the cistern and the water raised therefrom to the tank next below the top tank, the operation being repeated until all the tanks are filled. Air-valves leading into the tanks are then opened, when the water may be drawn through the service-pipes, as described. By this arrangement water may be elevated in stages to any desired height by the use of a single vacuum-chamber and the proper connection therewith, as described, and the intermediate connections with each other and with the main supply-reservoir.

An advantage in drawing the water from the bottom of the tank to the next higher tank, as shown, is that a water seal is thus provided, covering the bottom of the supply-pipe, the increased capacity of the lower tanks always preventing draining of their contents. It will be understood that the capacity of the vacuum-chamber should be regulated according to the number and size of the tanks, and these features, as well as other details of construction, are within the province of the designing engineer.

What I claim is—

1. Apparatus for raising water consisting of a tank connected with a source of water-supply, a separate vacuum-chamber, means for causing air-consuming combustion therein, an exhaust-pipe connected with the vacuum-chamber, and means preventing entrance of water into the vacuum-chamber, substantially as set forth.

2. Apparatus for raising water consisting of a tank connected with a source of water-supply, a separate vacuum-chamber, and an exhaust-pipe connected therewith and with the tank, with a float-controlled valve located in the tank adapted to seal the exhaust-pipe to prevent entrance of water into the vacuum-chamber, substantially as set forth.

3. The combination with a water-tank having a supply connection and a service-pipe, of a separate vacuum-chamber, an exhaust-pipe connected with the water-tank and with the vacuum-chamber, and a float-controlled valve adapted to seal the exhaust-pipe when the water in the tank rises, substantially as set forth.

4. The combination with a water-tank having a supply connection, of a separate vacuum-chamber, and an exhaust-pipe connected with the water-tank and the vacuum-chamber, and means controlled by variations in the water-level in the water-tank for closing the exhaust-pipe when the tank is charged with water, substantially as set forth.

5. The combination with a water-tank having a supply connection, of a separate vacuum-chamber having means for introducing a measured quantity of fuel thereinto, a pan, and a sparking device for causing ignition of the fuel, substantially as set forth.

6. The combination with a water-tank having a supply connection, of a separate vacuum-chamber having means for introducing a measured quantity of fuel thereinto, oppositely-located air-circulation openings and doors therefor, a pan, and a sparking device for causing ignition of the fuel, substantially as set forth.

7. A vacuum-tank provided with air-circulation openings, lever-controlled valves for sealing said openings, a closing-spring for one of said levers, means for causing air-consuming combustion within the tank, a suction-pipe connected with the tank and means preventing entrance of water through said pipe, substantially as set forth.

8. A vacuum-tank provided with air-circulation openings, means for sealing said openings, means permitting escape of air from the interior of said tank and for automatically preventing reëntrance of air, means for causing air-consuming combustion within the tank, and a suction-pipe provided with an automatically-operative closing-valve, substantially as set forth.

9. A vacuum-tank provided with oppositely-located air-circulation openings, lever-controlled closures therefor, means for holding said closures to their seats, means permitting one of said closures to automatically open to permit escape of air from the interior, means for causing air-consuming combustion within the tank, a suction-pipe connected with the tank, and means preventing entrance of water through said pipe, substantially as set forth.

10. A vacuum-tank provided with a fuel-pan, a pipe leading thereinto, a sparking device, a suction-pipe, and valve-controlled air-circulation openings, substantially as set forth.

11. The combination of a plurality of water-tanks located on successively higher levels, a feed-water supply to the top of the lowermost tank, supply-pipes connecting the bottom of each tank with the next higher tank, a separate vacuum-chamber, separate valve-controlled connections therefrom to each of the tanks, and valves admitting air to each tank, substantially as set forth.

12. The combination of a plurality of water-tanks located on successively higher levels, a feed-water supply to the lowermost tank, supply-pipes connecting the adjacent tanks, a separate vacuum-chamber provided with a fuel-pan and a sparking device, separate valve-controlled connections from the vacuum-chamber to each of the tanks, with air-admitting valves and service-pipes connected to each tank, substantially as set forth.

13. The combination of a plurality of water-tanks located on successively higher levels, a feed-water supply to the lowermost tank, supply-pipes connecting the bottom of each tank with the top of the next higher tank, a separate vacuum-chamber, separate valve-controlled connections therefrom to each of the tanks, and valves admitting air to each tank, substantially as set forth.

14. In apparatus for raising water, the combination of a plurality of water-tanks located on successively higher levels, a feed-water supply to the lowermost tank, supply-pipes connecting the bottom of each tank with the top of the next higher tank, service-pipes for each tank, separate valve-controlled air-inlet openings leading into each tank, a separate vacuum-chamber provided with a fuel-pan, a fuel-pipe and a sparking device, with separate valve-controlled connections from the vacuum-chamber to each of the tanks, substantially as set forth.

In testimony whereof I affix my signature in presence of two witnesses.

GEORGE W. MacKENZIE.

Witnesses:
    JAS. J. McAFEE,
    C. M. CLARKE.